(12) United States Patent
Olabi et al.

(10) Patent No.: US 11,978,590 B1
(45) Date of Patent: May 7, 2024

(54) INTEGRATED THERMAL MANAGEMENT SYSTEM WITH A SYMMETRICAL SUPERCAPACITOR CELL

(71) Applicant: University of Sharjah, Sharjah (AE)

(72) Inventors: Abdul Ghani Olabi, Sharjah (AE); Mohammad Ali Abdelkareem, Sharjah (AE); Qaisar Abbas, Sharjah (AE); Ahmed Al Makky, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 18/127,383

(22) Filed: Mar. 28, 2023

(51) Int. Cl.
*H01G 11/18* (2013.01)
*H01G 11/28* (2013.01)

(52) U.S. Cl.
CPC ............. *H01G 11/28* (2013.01); *H01G 11/18* (2013.01)

(58) Field of Classification Search
None
See application file for complete search history.

(56) References Cited

U.S. PATENT DOCUMENTS

| | | | | |
|---|---|---|---|---|
| 4,632,746 A * | 12/1986 | Bergman | ............. | G01N 27/404 204/415 |
| 5,338,429 A * | 8/1994 | Jolson | ................ | G01N 27/4045 204/415 |
| 5,783,052 A * | 7/1998 | Bakhir | ................ | C02F 1/46109 204/263 |
| 7,027,290 B1 * | 4/2006 | Thrap | ................... | H01G 11/18 361/274.2 |
| 2004/0146779 A1 * | 7/2004 | Haenni | ............... | H01M 8/2459 429/130 |
| 2007/0053140 A1 * | 3/2007 | Soliz | ........................ | H01G 9/08 361/502 |
| 2014/0093052 A1 * | 4/2014 | Chupas | ............ | G01N 23/20025 378/208 |
| 2018/0351069 A1 | 12/2018 | Boukai et al. | | |

(Continued)

FOREIGN PATENT DOCUMENTS

GB 2168159 A * 6/1986 ........... G01N 27/404

OTHER PUBLICATIONS

Richa Dubey, "Review of Carbon-Based Electrode Materials for Supercapacitor Energy Storage", Article, 2019, 1419-1445, vol. 25, Ionics.

(Continued)

*Primary Examiner* — Dion R. Ferguson
(74) *Attorney, Agent, or Firm* — MH2 TECHNOLOGY LAW GROUP, LLP

(57) ABSTRACT

A symmetrical supercapacitor cell is disclosed comprising at least two electrode split sections, at least two electrodes, a plurality of ring isolators, and a spring pin arrangement. The at least two electrodes are placed in between the at least two electrode split sections, wherein a plurality of ring isolators is connected with a plurality of bolts to fasten the at least two electrode split sections. Also disclosed is an integrated thermal management system with a supercapacitor cell including a base support holder, a heating coil casing, a heating coil, and a cavity. The heating coil is installed inside the heating coil casing that is underneath a supercapacitor cell body. Further, a cavity is formed around the supercapacitor cell and contains an oil that is heated via the installed heating coil to achieve a desired temperature.

10 Claims, 2 Drawing Sheets

(56) References Cited

U.S. PATENT DOCUMENTS

| | | | | |
|---|---|---|---|---|
| 2022/0094009 A1* | 3/2022 | Kelly | ............... | H01M 10/0468 |
| 2023/0124344 A1* | 4/2023 | Perera | ............... | H01M 50/204 |
| | | | | 429/7 |
| 2023/0238562 A1* | 7/2023 | Kusachi | ............ | H01M 10/0404 |
| | | | | 429/90 |
| 2023/0349056 A1* | 11/2023 | Schalenbach | ............ | C25B 9/63 |

OTHER PUBLICATIONS

Elizabeth Esther Miller, "Materials for Energy Storage: Review of Electrode Materials and Methods of Increasing Capacitance for Supercapacitors", Journal, 2018, 30-40, vol. 20, Journal of Energy Storage.

Dhruba P. Chatterjee, "A Review on the Recent Advances in Hybrid Supercapacitors", Journal, 2021, 15880-15918, vol. 9, Journal of Materials Chemistry A.

Vignesh Kumaravel, "Solid Electrolytes for High-Temperature Stable Batteries and Supercapacitors", Article, 2021, 1-42, vol. 11, Advanced Science News.

Patrice Simon, "Where Do Batteries End and Supercapacitors Begin", HAL Open Archive, 2014, 1210-1211, vol. 343, Science Magazine.

S. Aloqayli, "Nanostructured Cobalt Oxide and Cobalt Sulfide for Flexible, High Performance and Durable Supercapacitors", Journal, 2017, 68-76, vol. 8, Energy Storage Materials.

Alex I. Oje, "Effect of Temperature on the Electrochemical Performance of Silver Oxide Thin Films Supercapacitor", Journal, 2021, 1-6, vol. 882, Journal of Electroanalytical Chemistry.

Karthikeyan Krishnamoorthy, "Two Dimensional Siloxene-Graphene Heterostructure-Based High-Performance Supercapacitor for Capturing Regenerative Braking Energy in Electric Vehicles", Journal, 2021, 1-11, vol. 31, Advanced Science News.

Sanket Bhoyate, "Eco-Friendly and High Performance Supercapacitors for Elevated Temperature Applications Using Recycled Tea Leaves", Article, 2017, 1-12, vol. 1, Global Challenges.

Takashi Hibino, "High-Temperature Supercapacitor with a Proton-Conducting Metal Pyrophosphate Electrolyte", Article, 2015, 1-7, vol. 5, Scientific Reports.

Lewis W. Le Fevre, "High Temperature Supercapacitors Using Water-in-Salt Electrolytes: Stability Above 100° C", Journal, 2021, 5294-5297, vol. 57, Royal Society of Chemistry.

Jennifer Chapman Varela, "Piperidinium Ionic Liquids as Electrolyte Solvents for Sustained High Temperature Supercapacitor Operation", Journal, 2018, 5590-5593, vol. 54, Royal Society of Chemistry.

Ardalan Chaichi, "A Solid-State and Flexible Supercapacitor That Operates Across a Wide Temperature Range", Article, 2020, 5693-5704, vol. 3, ACS Applied Energy Materials.

Bouchra Asbani, "High Temperature Solid-State Supercapacitor Designed with Ionogel Electrolyte", Journal, 2019, 439-445, vol. 21, Energy Storage Materials.

Mazharul Haque, "Thermal Influence on the Electrochemical Behavior of a Supercapacitor Containing an Ionic Liquid Electrolyte", Journal, 2018, 249-260, vol. 263, Electrochimica Acta.

* cited by examiner

INTEGRATED THERMAL MANAGEMENT SYSTEM WITH A SYMMETRICAL SUPERCAPACITOR CELL

FIELD OF THE INVENTION

Embodiments of the present invention relate to the field of supercapacitors and, more particularly, an integrated thermal management system with a supercapacitor cell that provides the flexibility of taking measurements under ambient as well as higher temperatures.

BACKGROUND OF THE INVENTION

Background description includes information that will be useful in understanding the present invention. It is not an admission that any of the information provided herein is prior art or relevant to the presently claimed invention, or that any publication specifically or implicitly referenced is prior art.

Energy demand is increasing exponentially due to growth in the human population, global economic expansion, and more frequent use of energy-intensive appliances. This requires development and deployment in energy storage systems or devices. Several energy storage devices, such as redox flow batteries, rechargeable batteries, and supercapacitors, are being extensively used in the market.

The supercapacitor or ultracapacitor is a high-efficiency energy storage device, either an electric double-layer capacitor, a redox capacitor, or a hybrid capacitor—and is one of the leading technologies compared with other electrochemical energy storage devices such as conventional electrostatic capacitors and rechargeable batteries because of their characteristics such as ultrahigh power densities, exceptionally long cycle life, environmental friendliness, and reliability. Applications of supercapacitors have been broadening over time with the advancement in their technology.

Supercapacitor cells are used in many areas, such as gas sensing, power electronics, portable electronic devices, and military and transport applications. In some cases, the supercapacitor cells are operated under complex weather conditions, such as at very high operational temperatures. Moreover, supercapacitors have low energy densities compared to other leading energy storage technologies, such as lithium-ion batteries. One way of increasing their energy densities is by using electrolytes with higher operating potentials, such as room-temperature ionic liquids. However, these solutions have higher viscosities and lower ionic conductivities affecting their power densities.

Supercapacitors are electrochemical energy storage devices that are used for storing charge both electrostatically and electrochemically, where charge storage is mainly surface based through surface ions adsorption or by fast and fully reversible Faradic reaction, respectively.

Supercapacitors have high-power densities when compared with rechargeable batteries due to the nature of the adsorption process and the shallow accumulation of charges. Conventionally, batteries store charge in the bulk of active material through slow chemical reactions making the battery discharge equally slow. But the supercapacitor also addresses these deficiencies, i.e., the low power density and low energy density when operated at high temperatures.

Many methods are used to decrease the deficiency of energy storage systems, like supercapacitors. A new electrode material or the use of an electrolyte solution with high operational potentials is used to increase the energy density of supercapacitors.

Another approach is more attractive since energy stored in supercapacitors is proportional to the square of its voltage ($E=1/2CV^2$). However, electrolyte solutions with higher working potentials, such as room temperature ionic liquids (RTILs), have higher viscosities and lower conductivities which have a devastating impact on power densities of supercapacitors due to increased resistances (R) ($P=(\Delta V)^2/4R$).

But many issues are founded by operating supercapacitors at higher operating temperatures, which increases electrolyte conductivities (reduction in resistance—R) and improves their capacitances (C). Similarly, commercially used supercapacitors operate under different conditions, such as at very high temperatures.

Appropriate and efficient thermal management systems are vital for supercapacitors to work in a lab with electrolytes possessing more expansive potential windows requiring higher temperatures or to simulate their commercial applications.

However, these systems and methods are used in many equipment like a water baths, an electric oven, and microwave-based scientific thermal baths. These systems are either costly, inaccurate, or unreliable, creating a vacuum for a very costly device that provides unreliable data.

Another example is US20180351069A1 discloses a thermoelectric power management system that includes an electronic device comprising a user interface and a thermoelectric device. The thermoelectric device includes a thermoelectric unit, a coupler, at least one fastener coupled to the thermoelectric unit and a separate heat expelling team in thermal communication with the thermoelectric unit. The thermoelectric unit comprises a heat transfer surface that rests adjacent to a user's body surface, and the coupler removably secures the electronic device against the thermoelectric unit. Moreover, the at least one fastener secures the thermoelectric device to the body surface of the user and the thermoelectric device, during use, generates power upon the flow of thermal energy from the heat transfer surface to the separate heat-expelling unit.

But the above-disclosed patent has some disadvantages. The above preparation method discloses the thermoelectric unit and a separate heat expelling unit that produces power upon the flow of thermal energy from a heat transfer surface to the separate heat expelling unit. But the above patent does not disclose the integration of a thermal management system with a supercapacitor cell fabricated to enhance energy density and improve charge capacity.

In order to overcome the drawbacks as mentioned above, there is a need to develop an integrated thermal management system with a supercapacitor cell that is easily used in both a laboratory and a commercial setting alike. This invention is used in a wide variety of ionic liquids with higher operating potentials bringing the energy densities ever closer to rechargeable batteries and eliminating the need for very expensive thermal systems.

SUMMARY OF THE INVENTION

An embodiment of the present disclosure relates to a supercapacitor cell. In one general aspect, the supercapacitor cell may include at least two electrode split sections, at least two electrodes, a plurality of ring isolators, and a spring pin arrangement. The at least two electrode split sections include an upper split and a lower split.

By an embodiment of the present invention, the supercapacitor cell may also include the at least two electrodes that are placed in between the at least two electrode split sections in which the at least two electrodes are independently contacted with each other. The at least two electrodes include a positive electrode and a negative electrode. Further, a membrane is placed in between the at least two electrodes.

In accordance with an embodiment of the present invention, the at least two electrodes are placed in between at least two current collectors. Further, the at least two current collectors include a top current collector and a bottom current collector.

In accordance with an embodiment of the present invention, the plurality of ring isolators is connected with a plurality of bolts to fasten the at least two splits. Further, the plurality of ring isolators is made up of any one of a plastic, a rubber, a glass, and a ceramic, alike.

In accordance with an embodiment of the present invention, the supercapacitor cell includes the spring pin arrangement that is installed in an opening. Further, the opening is connected with the upper split via a screw and the plurality of bolts. Other embodiments of this aspect include corresponding computer systems, apparatus, and computer programs recorded on one or more computer storage devices, each configured to perform the actions of the devices.

In accordance with an embodiment of the present invention, the spring pin arrangement includes a pin head, a compression spring, and at least one O-ring. Further, the at least one O-ring is either a top O-ring or a bottom O-ring.

In accordance with an embodiment of the present invention, the at least one O-ring is attached to the lower split with a guide sleeve. Further, the guide sleeve is made up of any one of a Polytetrafluoroethylene (PTFE), a stainless steel, a titanium (Ti), or a Poly-etheretherketone (PEEK).

In one general aspect, an integrated thermal management system with a supercapacitor cell may include a base support holder, a heating coil casing, a heating coil, and a cavity.

In accordance with an embodiment of the present invention, the heating coil casing is placed upon the base support holder. The system further includes the heating coil that is installed inside the heating coil casing. Further, the heating coil casing is underneath a supercapacitor cell body.

In accordance with an embodiment of the present invention, the cavity is formed around the supercapacitor cell. Further, the cavity contains an oil that is heated for achieving a desired temperature.

In accordance with an embodiment of the present invention, the oil that is heated is uniformly distributed around the supercapacitor cell in order to control an operating temperature of the supercapacitor cell.

In accordance with an embodiment of the present invention, the operational temperature of the supercapacitor cell is not only controlled in a laboratory setting but also used in a commercial application where the supercapacitor cell is to be maintained at the desired temperature to optimize its performance.

In accordance with an embodiment of the present invention, the cavity includes an inner cavity and an outer cavity. Further, the supercapacitor cell is placed in the middle of the cavity.

In accordance with an embodiment of the present invention, an O-ring arrangement is placed inside the supercapacitor cell. Further, the O-ring arrangement includes at least two internal O-rings and at least two external O-rings.

In accordance with an embodiment of the present invention, an oil capping and at least one sensor is installed in the integrated thermal management system with the supercapacitor cell. Further, the at least one sensor is a temperature sensor.

In accordance with an embodiment of the present invention, the outer cavity is designed around the supercapacitor cell and is completely sealed that helps to isolate the supercapacitor cell from an outer environment.

The foregoing objectives of the present invention are to provide a flexible integration of a thermal management system with the supercapacitor cell that offers high performance with high energy density and power performance and improves charge capacity. This invention helps in controlling an operating temperature by evenly distributing the oil heated inside the supercapacitor cell.

BRIEF DESCRIPTION OF THE DRAWINGS

So that the manner in which the above recited features of the present invention is be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
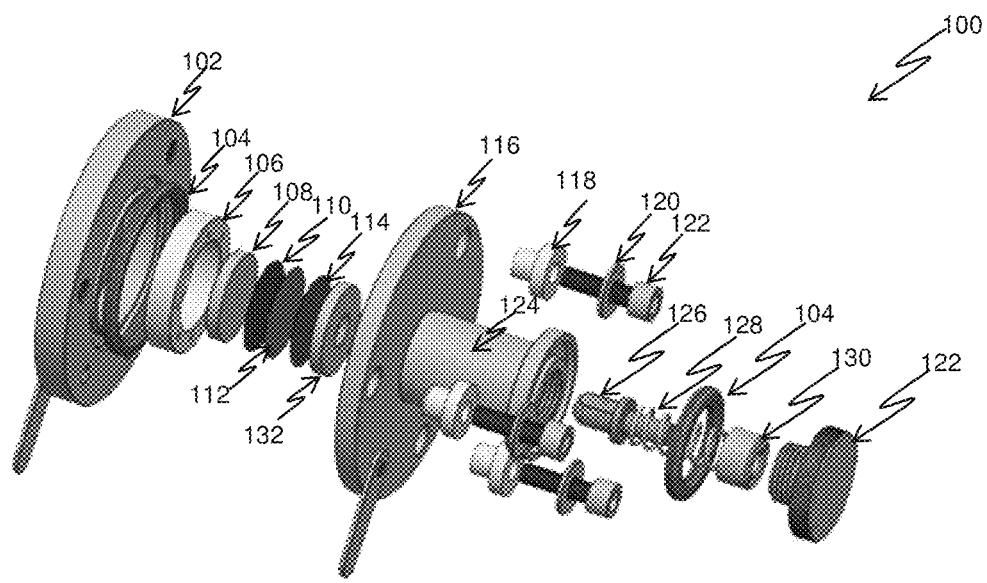
FIG. 1 is an exploded view of a supercapacitor cell, according to an embodiment of the present invention.

The present invention relates to an integrated thermal management system with a supercapacitor cell which helps in controlling an operating temperature of the supercapacitor cell not only in a laboratory setting but also in a commercial application in order to optimize the performance of the supercapacitor cell.

The principles of the present invention and their advantages are best understood by referring to FIG. 1 to FIG. 4. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Supercapacitors are one of the leading technologies when compared with other electrochemical energy storage systems such as conventional electrostatic capacitors and rechargeable batteries, owing to their superior characteristics such as ultrahigh power densities, exceptionally long cycle life, environmentally friendliness, reliability, and high efficiency. Applications of supercapacitors have been broadening over time with the advancement in their technology. Supercapacitors are currently used in diverse range of applications such as gas sensing, power electronics, portable electronic devices, military, and transport applications. In some of the applications supercapacitor cells can be operated under very harsh weather conditions such as at very high operational temperatures. Moreover, supercapacitors have inferior energy densities when compared with other leading energy storage technologies such as lithium-ion batteries. One way of increasing their energy densities is by using electrolytes with higher operating potentials such as room temperature ionic liquids. However, these solutions have higher viscosities and lower ionic conductivities effecting their power densities, various research studies have showed that their ionic conductivities can be improved by increasing their operating temperatures. Therefore, developing and using supercapacitor cell with temperature control mechanism is extremely important to model the high temperature operating conditions and used as test cell to evaluate the performance of supercapacitor cell at elevated temperatures while using different electrolyte solutions. The present invention discloses a two-electrode symmetrical supercapacitor cell with controlled temperature system (commonly applicable in both commercial applications and for material analysis in laboratories).

FIG. 1 is an exploded view of a supercapacitor cell 100, according to an embodiment of the present invention. The supercapacitor cell 100 includes at least two electrode split sections (102,116), at least two electrodes (110,114), a plurality of ring isolators 118, and a spring pin arrangement.

In accordance with an embodiment of the present invention, the at least two electrode split sections (102,116) include an upper split 116 and a lower split 102. The at least two electrode split sections (102,116) are made up of a stainless steel. In accordance with an embodiment of the present invention, the supercapacitor cell 100 may also include the at least two electrodes (110,114) that are placed in between the at least two electrode split sections (102,116) in which the at least two electrodes (110,114) are independently contacted with each other. The at least two electrodes (110,114) include a positive electrode and a negative electrode.

The positive electrode is the electrode with a higher potential than the negative electrode. During the discharge of the supercapacitor cell 100, the positive electrode is a cathode, and the negative electrode is an anode. During the charge of the supercapacitor cell, the positive electrode is an anode, and the negative electrode is a cathode. Further, the at least two electrodes (110,114) are coated with a porous material known as activated carbon.

In accordance with an embodiment of the present invention, a membrane 112 is placed in between the at least two electrodes (110,114). The membrane 112 is used as a separator between the at least two electrodes (110,114). The membrane 112 is important to avoid short circuits of the positive and negative electrodes (110,114) of the supercapacitor cell 100 and provide suitable ion channels for an electrolyte of the supercapacitor cell 100.

In accordance with an embodiment of the present invention, the at least two electrodes (110,114) are placed in between at least two current collectors (108,132). Further, the at least two current collectors (108,132) include a top current collector and a bottom current collector.

The at least two current collectors (108,132) serve to efficiently transfer electrons from the supercapacitor cell 100 to external power sources or electrical appliances. The at least two current collectors (108,132) are made up of any one of a metal foil, metal foam, polymer film, paper-coated metal substrate, and carbon fiber. The metals, for example, a nickel, a steel, an aluminum, a copper, a titanium, a platinum and a gold are most frequently utilized as the at least two current collectors (108,132) metals.

In accordance with an embodiment of the present invention, the plurality of ring isolators 118 is connected with a plurality of bolts 122 to fasten the at least two electrode split sections (102,116) by using a plurality of bolt ring 120. Further, the plurality of ring isolators 118 is made up of any one of a plastic, a rubber, a glass, and ceramic.

In accordance with an embodiment of the present invention, the supercapacitor cell 100 includes the spring pin arrangement that is installed in an opening 124. Further, the opening 124 is connected with the upper split 116 via a screw 130 and the plurality of bolts 122.

In accordance with an embodiment of the present invention, the plurality of bolts 122 is anyone of an anchor bolt, a carriage bolt, an eye bolt, a hex bolt, or a square head bolt, alike. The screw 130 is a grub screw that is used to secure the upper split 116 with the lower split 102. The grub screw is very versatile because it is used to secure the at least two electrode split sections (102,116) without a nut and it requires a very small and unobtrusive fixing.

In accordance with an embodiment of the present invention, the spring pin arrangement includes a pin head 126, a compression spring 128, and at least one O-ring 104. Further, the at least one O-ring 104 is either a top O-ring or a bottom O-ring.

In accordance with an embodiment of the present invention, the at least one O-ring 104 is attached to the lower split 102 with a guide sleeve 106. Further, the guide sleeve 106 is made up of any one of Polytetrafluoroethylene (PTFE), a stainless steel, titanium (Ti), and Poly-etheretherketone (PEEK), alike.

Figure 2:
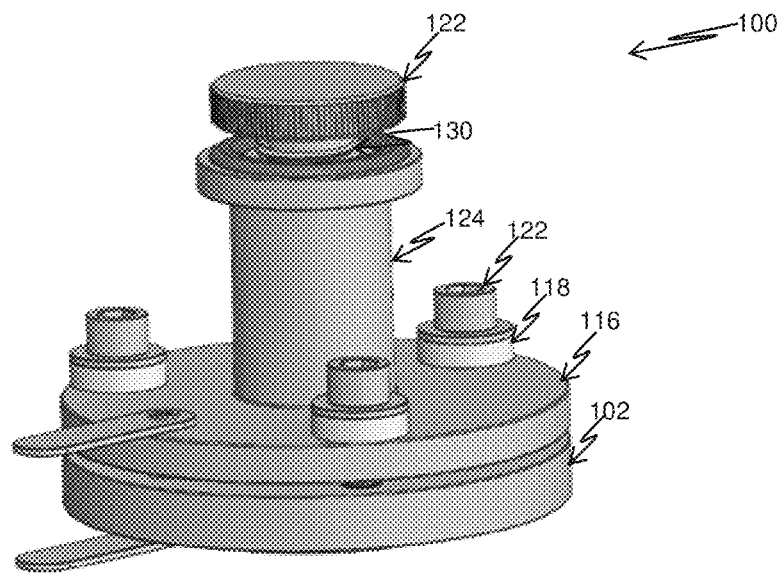
FIG. 2 is a perspective view of the supercapacitor cell, according to an embodiment of the present invention.

FIG. 2 is a perspective view of the supercapacitor cell 100, according to an embodiment of the present invention. The supercapacitor cells 100 (refer to FIG. 1) are flexible and symmetric. So, the flexible symmetric supercapacitor (FSS) cell 100 is one kind of electrochemical energy device with high power density, long cycling life, and superior flexibility, which is composed of a membrane 112 placed in between the at least two electrodes (110,114).

Figure 3:
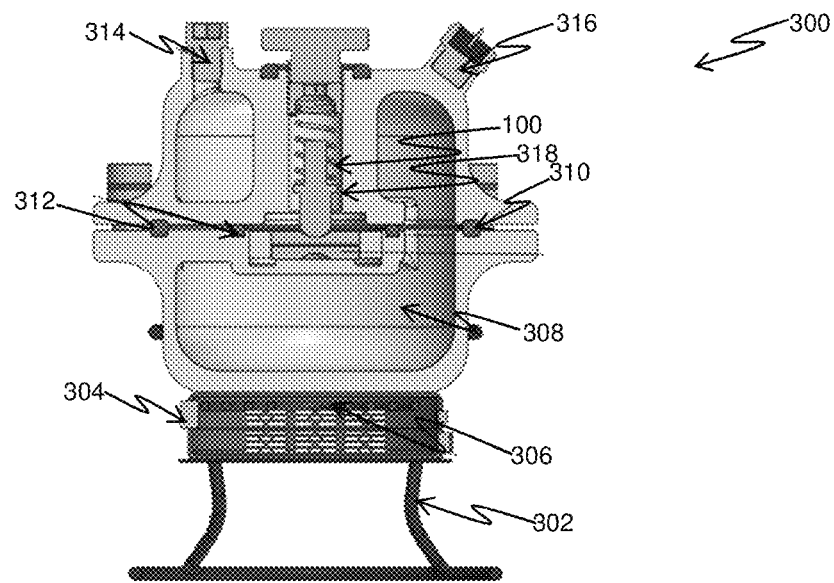
FIG. 3 is a cross-sectional view of an integrated thermal management system with a supercapacitor cell, according to an embodiment of the present invention.

FIG. 3 is a cross-sectional view of an integrated thermal management system with a supercapacitor cell 300, according to an embodiment of the present invention. In one general aspect, the integrated thermal management system with the supercapacitor cell 300 may include a base support holder 302, a heating coil casing 304, a heating coil 306, and a cavity 308.

In accordance with an embodiment of the present invention, the heating coil casing 304 is placed upon the base support holder 302. The system 300 further includes the heating coil 306 that is installed inside the heating coil casing 304. Further, the heating coil casing 304 is underneath a supercapacitor cell body 318.

In accordance with an embodiment of the present invention, the cavity 308 is formed around the supercapacitor cell 100 (refer FIG. 1). Further, the cavity 308 contains an oil that is heated for achieving a desired temperature. In accordance with an embodiment of the present invention, the oil that is heated is uniformly distributed around the supercapacitor cell 100 (refer FIG. 1) in order to control an operating temperature of the supercapacitor cell 100.

In accordance with an embodiment of the present invention, the operational temperature of the supercapacitor cell 100 is not only controlled in a laboratory setting but also used in a commercial application where the supercapacitor cell 100 (refer FIG. 1) is to be maintained at the desired temperature to optimize its performance.

In accordance with an embodiment of the present invention, the cavity 308 includes an inner cavity and an outer cavity. Further, the supercapacitor cell 100 (refer FIG. 1) is placed in the middle of the cavity 308.

In accordance with an embodiment of the present invention, an O-ring arrangement is placed inside the supercapacitor cell. Further, the O-ring arrangement includes at least two internal O-rings 312 and at least two external O-rings 310. In accordance with an embodiment of the present invention, an oil capping 314 and at least one sensor 316 is installed in the integrated thermal management system with the supercapacitor cell 300. Further, the at least one sensor 316 is a temperature sensor.

In accordance with an embodiment of the present invention, the temperature sensor 316 is used for measuring a temperature of an environment of the integrated thermal management system with the supercapacitor cell 300.

In accordance with an embodiment of the present invention, the outer cavity 308 is designed around the supercapacitor cell 100 (refer FIG. 1) and is completely sealed which helps to isolate the supercapacitor cell 100 from an outer environment.

Figure 4:
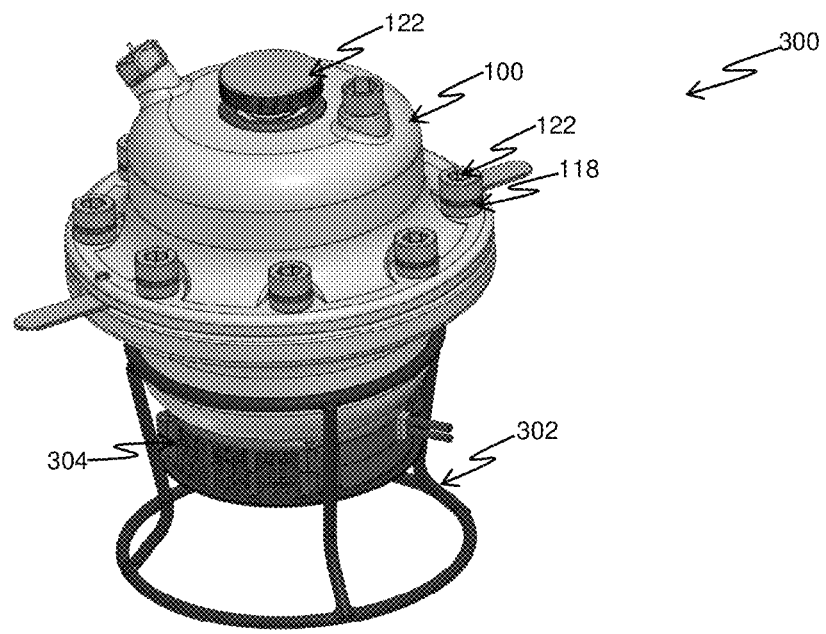
FIG. 4 is a perspective view of the integrated thermal management system with the supercapacitor cell, according to an embodiment of the present invention.

FIG. 4 is a perspective view of the integrated thermal management system with the supercapacitor cell 300 (refer FIG. 3), according to an embodiment of the present invention. The supercapacitor cell 100 (refer FIG. 1) is incorporated with the integrated thermal management system 300 where electrically heated coils 306 are installed at the base support holder 302 of the supercapacitor cell 100 which heats the oil inside the cavity 308 encompassing the supercapacitor cell 100, resulting in increasing the operating temperature to a desired level of supercapacitor cell 100.

In accordance with an advantageous embodiment of the present invention, this new design of the integrated thermal management system with the supercapacitor cell 300 (refer FIG. 3) helps in addressing inherent deficiencies of the energy densities of the supercapacitors cells with the application of high operational voltage electrolytes while maintaining superior power densities.

In accordance with an advantageous embodiment of the present invention, this new design of the integrated thermal management system with the supercapacitor cell 300 (refer FIG. 3) may bring commercially used supercapacitor's energy densities even closer to the widely used rechargeable batteries with added benefits of environmental friendliness, very long cycle life, negligible maintaining costs and outstanding capacity retention.

In accordance with an advantageous embodiment of the present invention, the integrated thermal management system with the supercapacitor cell 300 (refer FIG. 3) is equally useful in both the laboratory setting as well as in wider commercial applications. This invention may generate huge commercial interest due to the simplicity of design, portable nature, and cost-effectiveness.

In accordance with another advantageous embodiment of the present invention, the integrated thermal management system with the supercapacitor cell 300 (refer FIG. 3) provide fast charging, ultrahigh energy density, and ultrahigh power density. Further, the integrated thermal management system with the supercapacitor cell 300 is precisely controlled the operating temperature to a desired level, and the oil that is heated is evenly distributed around the supercapacitor cell 100 (refer FIG. 1).

In accordance with an exemplary embodiment of the present invention, the integrated thermal management system with the supercapacitor cell 300 (refer FIG. 3) helps in maintaining the operating temperature of a room beyond 250° C. (482° F.).

In accordance with another advantageous embodiment of the present invention, the integrated thermal management system with the supercapacitor cell 300 (refer FIG. 3) is used in many real-time applications that is any one of a solar energy storage device, a portable electronic device, an automobile, a transportation device, a hybrid electric vehicle, a high voltage circuits, a medical device, or a backup system, alike.

In accordance with an embodiment of the present invention, a supercapacitor cell coupled with integrated thermal management system has several advantages over conventionally used systems to manage cell's temperature such as, being a cost-effective solution when compared with commercially available thermal bath which can cost in some cases in excess of few thousand dollars, compact size makes it highly portable system since its can be attached to the electrochemical cell and is slightly larger than the cell. It provides the flexibility of taking measurements under ambient as well higher temperatures. Homogeneity and precise controls over operating temperatures since entire cell assembly is inside thermal jacket. The proposed cell is designed around commercially a two-electrode symmetrical cell, and is functional with different types of electrolyte solutions since it can operate under vacuum as solutions such as organic solutions and room temperature ionic liquids require (RTILs) vacuum for their use. Easily scalable due to the simplicity of its design making it highly desirable product commercially.

In some embodiments, the portable electronic device is a watch, a health or fitness tracking device, or a waste heat recovery unit. The electronic appliances or devices may be part of a larger system including other electronic devices and a control module, for example. Other electronic devices may be used, such as, for example, a refrigerator, an oven, a microwave, a computer processor, a vehicle engine, a pipe or other conduit (e.g., exhaust pipe), a motor, or other sources of heat, such as waste heat.

In accordance with the present invention, an integrated system encompassing the supercapacitor cell where desired temperature of the cell is achieved with extreme precision by heating the oil filled inside the cavity attached around supercapacitor cell using heating coils installed underneath the cell's main body. The system uses commercially adopted two electrode symmetrical cells maintains precise control over the operating temperature due to uniform distribution of heated oil around the cell. This proposed device provides one universal device to monitor and control the cell's temperature. Developing and using a supercapacitor cell with temperature control mechanism is important to model the high temperature operating conditions and being used as test cell to evaluate the performance of supercapacitor cell at elevated temperatures while using different electrolyte solutions. In another embodiment, a test cell is designed based on two electrode symmetrical cell assembly with thermal management systems which is used in both laboratory and commercial settings alike. The new design helps in addressing the inherent deficiencies of inferior energy densities of supercapacitors with the application of high operational voltage electrolytes while maintaining superior power densities and brings commercially used super-capacitor's energy densities closer to widely used rechargeable batteries with added benefits of environmentally friendliness, long cycle life, negligible maintaining costs and outstanding capacity retention.

The proposed integrated system encompasses the supercapacitor cell where desired temperature of the cell can be achieved with extreme precision by heating the oil filled inside the cavity attached around supercapacitor cell using heating coils installed underneath the cell's main body.

The present invention discloses a supercapacitor cell coupled with the thermal management system. This new cell design incorporates integrated thermal management system where electrically heated coils installed at the base of the cell which will heat the oil inside a closed cavity encompassing the cell, resulting in increasing the operating temperature to desired level of supercapacitor cell. This design helps in addressing the inherent deficiencies of inferior energy densities of supercapacitors with the application of high operational voltage electrolytes while maintaining superior power densities. This design also brings commercially used supercapacitor's energy densities even closer to the widely used rechargeable batteries with added benefits of environmentally friendliness, very long cycle life, negligible maintaining costs and outstanding capacity retention, and will be equally useful in both laboratories setting as well as in wider commercial application. This is capable of generating huge commercial interest due to the simplicity of design, portable nature, and cost-effectiveness.

The proposed temperature-controlled supercapacitor device may be efficiently tested and applied in various real-time applications, such as for future electrochemical energy storage, hybrid electric vehicles, automobiles, transportation, high-voltage circuits, medical devices and backup systems. Advantages associated with the present invention include precisely controlled temperatures and evenly distributed heating around the cell, enhanced energy density, retained high power density, improved charge capacity and maintaining operating temperature of room temperature to beyond 250° C. (482° F.).

It should be noted that the invention has been described with reference to particular embodiments and that the invention is not limited to the embodiments described herein. Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

The invention claimed is:

1. A supercapacitor cell, comprising:
   at least two electrode split sections, wherein the at least two electrode split sections include an upper split and a lower split;
   at least two electrodes placed in between the at least two electrode split sections, wherein the at least two electrodes are independently contacted with each other;
   a plurality of ring isolators connected with a plurality of bolts to fasten the at least two at least two electrode split sections; and
   a spring pin arrangement installed in an opening connected with the upper split via a screw and the plurality of bolts.

2. The supercapacitor cell as claimed in claim 1, wherein the at least two electrodes include a positive electrode and a negative electrode.

3. The supercapacitor cell as claimed in claim 1, wherein the spring pin arrangement includes a pin head, a compression spring, and at least one O-ring.

4. The supercapacitor cell as claimed in claim 1, wherein the at least one O-ring is either a top O-ring or a bottom O-ring.

5. The supercapacitor cell as claimed in claim 1, wherein a membrane is placed in between the at least two electrodes.

6. The supercapacitor cell as claimed in claim 1, wherein the at least two electrodes are placed in between at least two current collectors.

7. The supercapacitor cell as claimed in claim 6, wherein the at least two current collectors include a top current collector and a bottom current collector.

8. The supercapacitor cell as claimed in claim 4, wherein the at least one O-ring is attached to the lower split with a guide sleeve.

9. The supercapacitor cell as claimed in claim 8, wherein the guide sleeve is made up of any one of a Polytetrafluoroethylene (PTFE), a stainless steel, a titanium (Ti), and a Polyetheretherketone (PEEK), alike.

10. The supercapacitor cell as claimed in claim 1, wherein the plurality of ring isolators is made up of any one of a plastic, a rubber, a glass, and a ceramic, alike.

* * * * *